March 5, 1968
W. H. HIMES
3,371,805
COMBINED ELEVATING AND CLOSING MECHANISM
FOR CARGO PLATFORMS
Filed Aug. 2, 1967
3 Sheets-Sheet 1
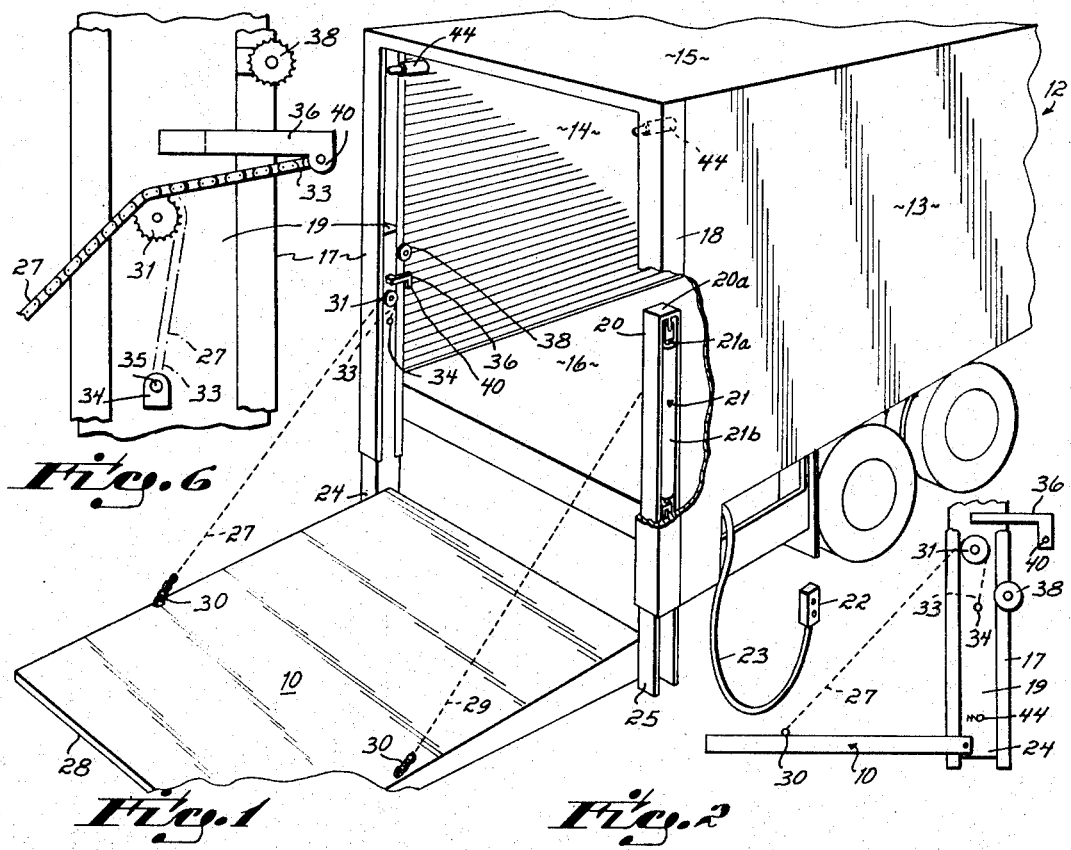
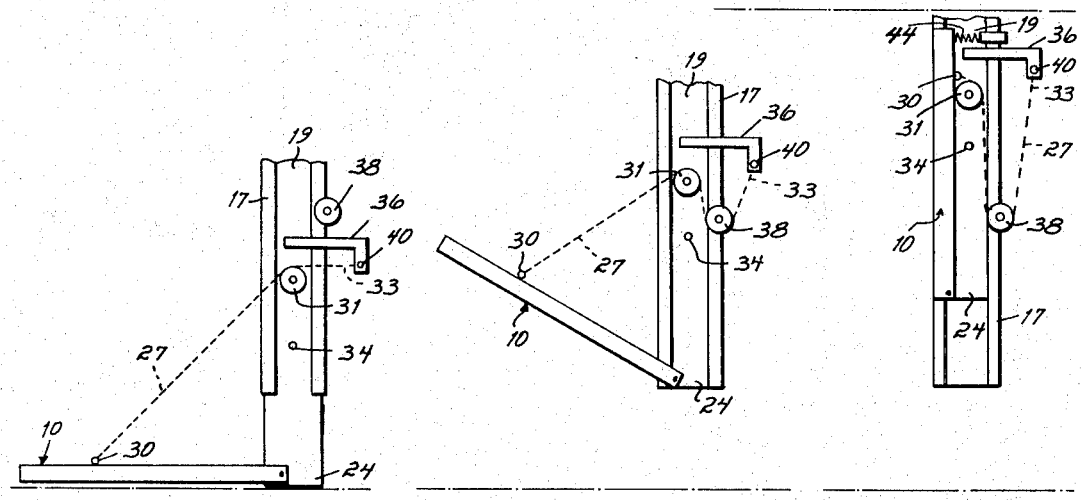
INVENTOR
William H. Himes
BY
Wood, Herron & Evans
ATTORNEYS March 5, 1968
W. H. HIMES
3,371,805
COMBINED ELEVATING AND CLOSING MECHANISM
FOR CARGO PLATFORMS
Filed Aug. 2, 1967
3 Sheets-Sheet 2
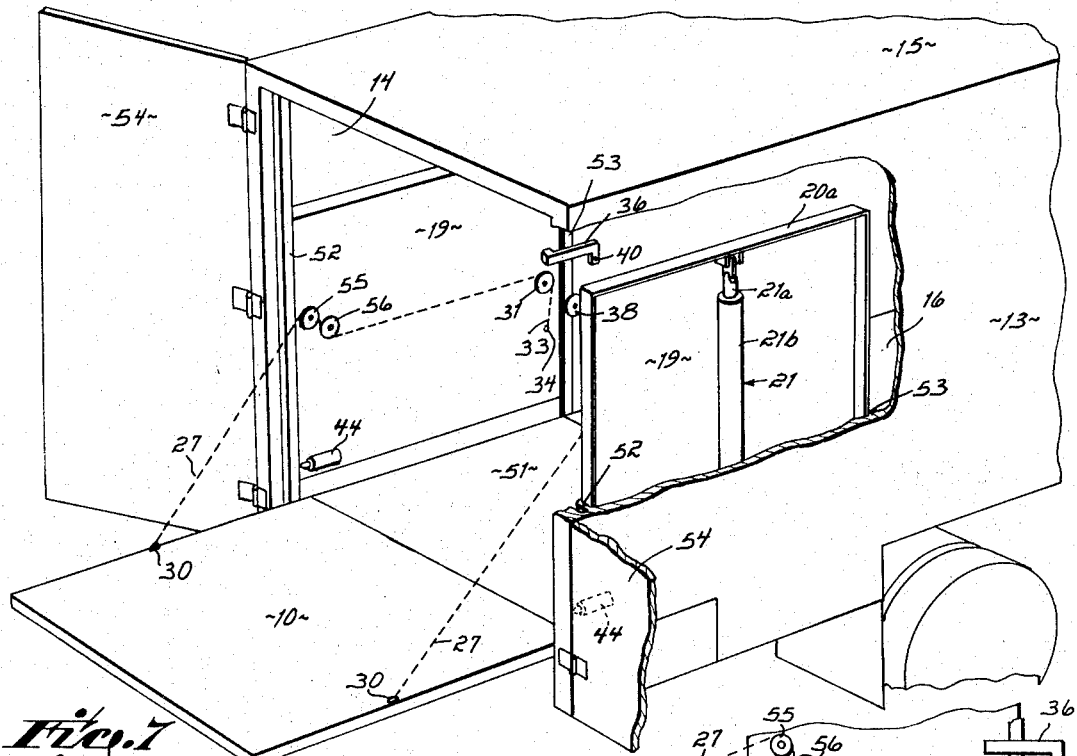
Fig. 7
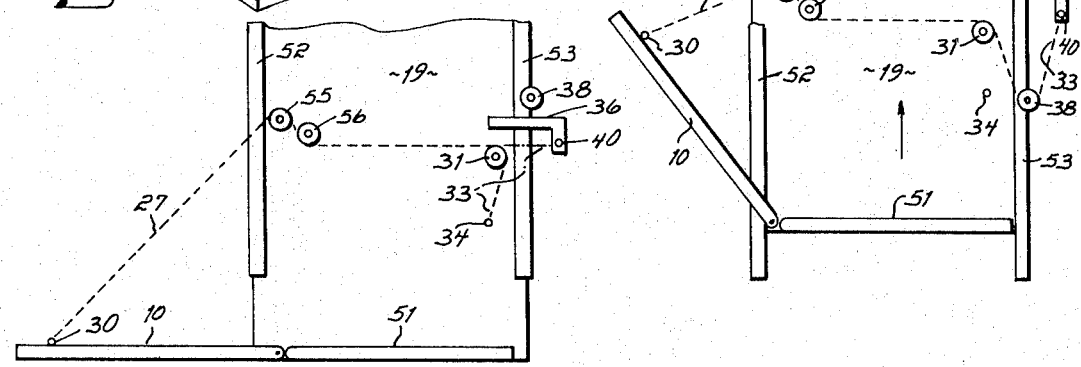
Fig. 8
Fig. 9
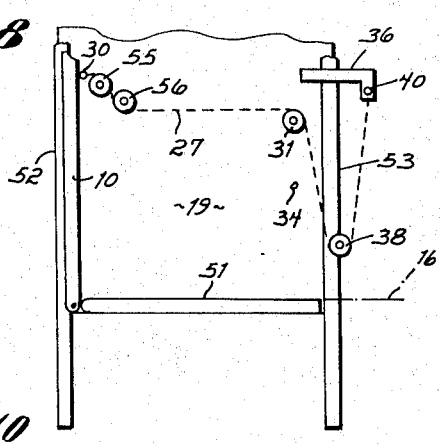
Fig. 10
INVENTOR
William H. Himes
BY
Wood, Herron & Evans
ATTORNEYS

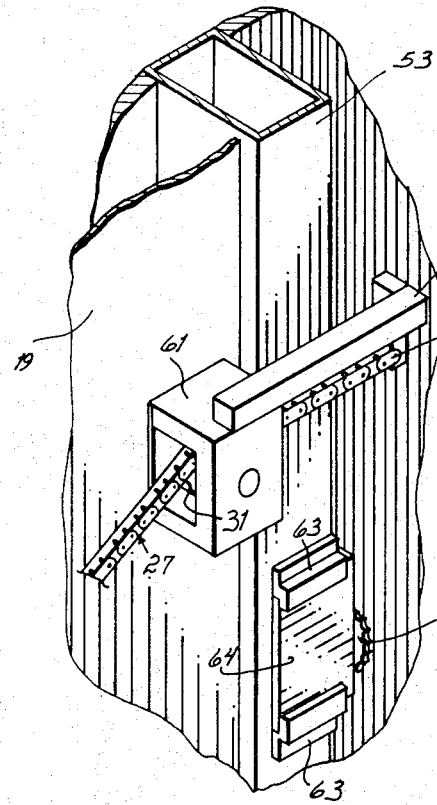
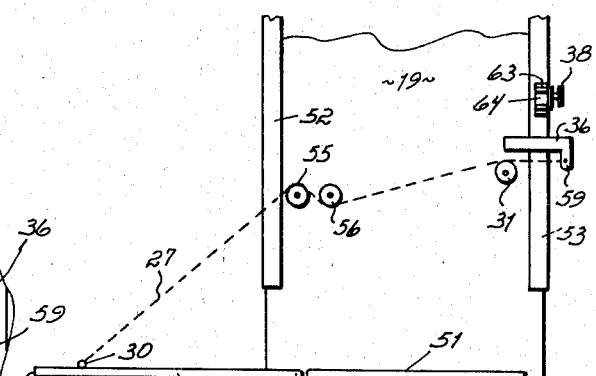
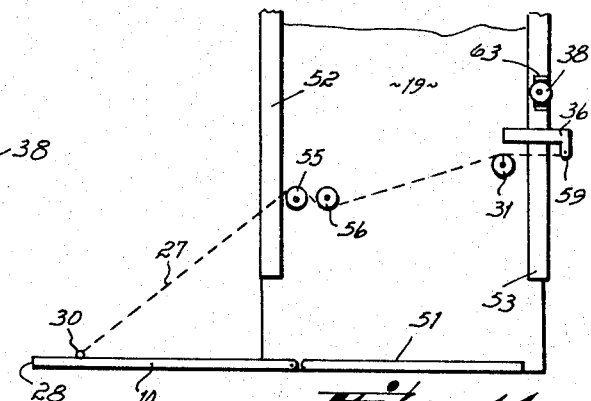
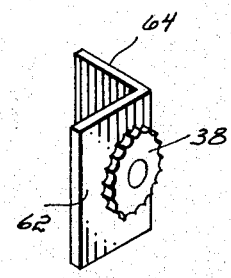
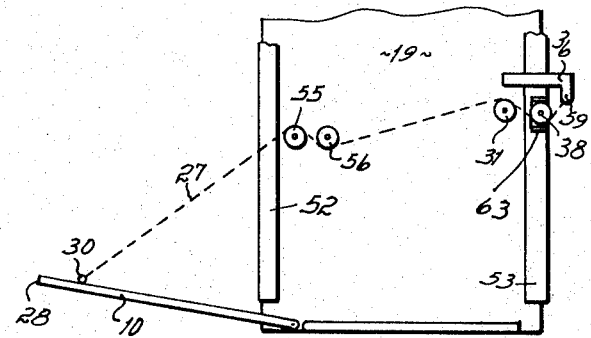

United States Patent Office 3,371,805
Patented Mar. 5, 1968

3,371,805
COMBINED ELEVATING AND CLOSING MECHANISM FOR CARGO PLATFORMS
William H. Himes, Dayton, Ohio, assignor to Leyman Manufacturing Corporation, Cincinnati, Ohio, a corporation of Ohio
Continuation-in-part of application Ser. No. 565,610, July 15, 1966. This application Aug. 2, 1967, Ser. No. 660,562
21 Claims. (Cl. 214—75)

ABSTRACT OF THE DISCLOSURE

A cargo door assembly for use with trailer trucks and the like including, for example, a first and a second mast assembly associated with opposite side walls of the truck's rear opening, each of the assemblies having a mast guide and a mast movable relative thereto, a platform pivotally secured adjacent the lower ends of the mast to permit swinging movement of the platform between an open and and a closed position, a chain having two ends with one of the ends being connected to the door, a compounding wheel rotatably mounted to the first mast guide, and a first anchor mounted to the first mast, the other end of the chain being connected to the first anchor, whereby the compounding wheel is selectively positionable between a first operating position whereat the chain can be engaged by the compounding wheel between the chain's ends when the masts are moved relative to the mast guide for swinging the platform between an open and a closed position like a door, and a second operating position whereat the chain can be engaged by the compounding wheel when the masts are moved relative to the mast guide for raising and lowering the platform like an elevator.

---

This application is a continuation-in-part of my copending aplication, Ser. No. 565,610, filed July 15, 1966, now abandoned.

This invention relates to improvements in elevatable platform structures of the type which includes a door, a platform pivotable about a horizontal axis between a vertical or closed position and a horizontal or open position, and which, in the horizontal position, can be raised or lowered as an elevator.

Truck and van doors or tailgates adapted to operate as elevators are well known in the prior art. Such tailgates or doors act as closures for the rear or cargo area of the truck body and are swingable between horizontal and vertical positions, being supported by structure mounted on the truck body. When such tailgates are used as elevators, the tailgate is pivoted from its vertical or closed position to its horizontal or open position. Once in the horizontal position, the platform may be moved up and down between the bed or floor of the truck and ground level or a loading dock. Such elevator-like movement allows quick, efficient loading and unloading of the truck's cargo space by providing lift means which permits the tailgate to be adjusted to a first loading level for easy transferral of the cargo onto the tailgate and, then, to be raised or lowered in a horizontal plane to a second level for easy transferral of the cargo off the platform.

Such prior art mechanisms have often required manual force to pivot the platform between the horizontal open or loading attitude and the vertical closed or transit attitude. Since the platform may comprise either the entire rear door structure, or a substantial part of it, for a van, its weight is substantial. However where the van is large it is desirable to have mechanical assistance for changing the attitude of the platform as well as raising and lowering it. Such devices as have been used before for this purpose have been unusually heavy, expensive and complex.

Hence, it has been an objective of this invention to provide simplified and improved elevator platform structure whereby the opening and closing of the platform is carried out automatically as desired, and whereby the platform through use of the same lift equipment.

This invention relates to a simplified, efficient and light weight mechanism for mechanically changing the attitude of a platform or door between a vertical and a horizontal position, while also providing lift means for operating the platform in elevator-like fashion when in the horizontal position. The invention is especially suitable for use on large cargo trucks, e.g., the semi-trailer vans, where the platform may constitute all or a large portion of the doorway closure, but can also be employed in other vehicular or industrial freight handling installations in which the platform when in vertical attitude does not entirely cover the door opening.

The apparatus provided by the invention for effecting a mechanical opening and closing or pivoting of a cargo platform from a vertical to a horizontal position and vice versa, while also providing lift means for operating the platform as an elevator, includes two guides or vertical channels which are preferably secured along opposite sides of a cargo loading opening. A slidebar or mast is slidably engaged with each guide, and the platform or door is mounted to the masts, opposite bottom corners of the platform being pivotally secured adjacent the lower ends of the masts. The masts and platform are coupled to elevating means for raising and lowerding the entire mast and platform assembly on the guides such that the platform may be shifted between various loading levels, for example, from a vehicle bed or floor to the ground or loading dock level and returned.

Flexible tension members or chains are preferably secured adjacent each top corner of the platform, i.e., those corners not pivotally secured to the masts, and at the other ends the chains are selectively connectable to elevator anchors on the respective masts so that the platform may be maintained in a horizontal or other stable position while it is being raised or lowered. Each flexible tension member preferably passes over a sprocket or bearing wheel on the mast above the point at which the tension member is removably anchored thereto for elevator-like operation of the platform.

A second or compounding anchor is also mounted to each mast at a position which is forward of the bearing wheel, or in the direction opposite to that in which the platform opens. Each tension member is selectively connectable to its respective compounding anchor.

A compounding wheel or bearing is associated with each guide, at a position which in the horizontal direction is between the bearing wheel and the compounding anchor on the mast, and such that when the selectively connectable end of each flexible tension member is detached from the first anchor point (which permits elevator-like operation) and is connected to the second anchor, the flexible tension member is engaged and compounded or "doubled" by the compounding wheels as the masts are raised relative to the guides by the lift means, to close the platform as it is raised.

By this structure, the platform may be raised or lowered while in the horizontal position when the movable ends of each flexible tension member are secured to the elevator anchors, or alternatively, the platform may be simultaneously raised and closed, or lowered and opened, by securing the movable ends of each flexible tension member to the compounding anchors. The platform is closed by the compounding action of the compounding wheels whereby the portion of the flexible tension member between the bearing wheel and the compounding anchor is continuously lengthened, thereby bringing the outer end of the chain toward the anchor. In the elevator-like mode of operation there is no compounding engagement of the compounding wheels with the chains and, hence, no shortening of the chain length when the masts are caused to move up and down on the guides.

The cargo platform just described incorporates a selectively connectable chain attachable at one end to either an elevating anchor or a compounding anchor, depending upon which function the apparatus is to perform. However, under certain circumstances it may be desirable to provide a permanently mounted chain or other flexible tension member. A permanent mounting obviates the necessity for changing the selectively connectable chain end from the compounding anchor to the elevating anchor and vice versa. This, in turn, obviates the necessity of providing slack in the tension member by supporting the cargo platform when the tension member is being changed from, for example, the elevating anchor to the compounding anchor.

The alternative structure is similar in certain respects to the structures described above. A compounding anchor and compounding wheel are provided in the same spatial arrangement relative to the mast and mast guide, however, the elevating anchor is no longer required. The compounding wheel is mounted so that it may be selectively moved into or out of engagement with the flexible tension member, depending upon whether it is desired that the cargo platform function as an elevator, or as a closure element or door. When it is desired that the cargo platform act as an elevator the compounding wheel is merely removed from its compounding position so that the tension member does not engage the compounding wheel as the mast, and the cargo platform therewith, is raised and lowered relative to the guide by the lift means, thereby permitting the platform to be raised and lowered in the horizontal or elevator-like position. Alternatively, the compounding wheel may be positioned relative to the fixed tension member such that as the mast and platform are raised by the lift means the tension member is engaged and compounded or "doubled" by the compounding wheel, thereby pivoting the platform upwardly as it is raised so that the platform functions as a closure element or door.

The structure and operation of the present invention will be more readily apparent from the following detailed description of the drawings which illustrate a preferred and an alternative embodiment of the invention.

In the drawings:

FIGURE 1 is a perspective view, partly broken away, of the tailgate portion of a cargo-carrying vehicle provided with mechanism in accordance with this invention.

FIGURE 2 is a diagrammatic side view of one of the two mast assemblies showing the platform door in the horizontal plane at truck bed level, with the support chain set for vertical movement of the platform in elevator-like fashion.

FIGURE 3 is a diagrammatic view similar to FIGURE 2 showing the platform at ground level with the support chain adjusted for closing movement of the platform.

FIGURE 4 is a view similar to FIGURE 3 showing the platform in partially closed position.

FIGURE 5 is a view similar to FIGURES 3 and 4 showing the platform in a completely closed position.

FIGURE 6 is an enlarged side elevation of the mast and anchor structure showing the manner in which the chain connections are changed.

FIGURE 7 is a view similar to FIGURE 1 showing the alternative embodiment of the invention.

FIGURE 8 is a diagrammatic side view of one of the two mast assemblies similar to FIGURE 2.

FIGURE 9 is a diagrammatic side view similar to FIGURE 4.

FIGURE 10 is a diagrammatic side view similar to FIGURE 5.

FIGURE 11 is a fragmentary perspective view of the compounding wheel-compounding anchor assembly showing a second alternative embodiment of the invention.

FIGURE 12 is a perspective view of the selectively mountable compounding wheel structure partially shown in FIGURE 11.

FIGURE 13 is a diagrammatic side view of one of the two mast assemblies, in accordance with the second alternative embodiment, showing the cargo platform at ground level with the compounding wheel mounted for vertical movement of the platform in elevator-like fashion.

FIGURE 14 is a diagrammatic view similar to FIGURE 13 showing the platform at ground level with the compounding wheel mounted for closing movement of the platform.

FIGURE 15 is a view similar to FIGURE 14 showing the platform in a partially closed attitude.

As best seen in FIGURE 1, door 10 is suitably located at the rear opening of a cargo vehicle, van, or truck body 12 having side walls 13, 14, a top 15 and a bed or floor 16. Secured to the sides 13, 14 of the truck body 12 adjacent the rear vertical edges thereof is a mast assembly which includes vertical U- or block C-shaped channels or mast guides 17, 18. The mast guides 17 and 18 are mounted so that their open sides face one another across the truck loading opening. Slide bars, movable members or masts 19 and 20 are received within the respective mast guides 17, 18 for vertical sliding movement therein. The masts 19, 20 may be U-shaped in horizontal section with the bases of the U sections being oriented inwardly. These masts 19 and 20 have horizontal partitions or cross braces one of which is shown at 20a in FIGURE 1 for engagement by mast lifting means to selectively raise and lower the masts along the respective guides 17, 18. Mechanical, hydraulic or pneumatic means such as a pair of linear fluid motors, one of which is shown at 21, is disposed within the interior of each mast and has a ram 21a which is coupled to the mast cross-brace 20a. The cylinders 21b of the motors are actuated by pressure fluid supplied by a pump (not shown) which may suitably be mounted beneath the cargo body 12 and which is electrically controlled from a control box 22. The control box 22 has been provided with a flexible electrical conduit 23 to permit the operator to stand away from or in back of the truck to observe the operation of the rear door or platform 10.

The door 10 is pivoted at its lower edge adjacent the bottom ends 24, 25 of the masts 19, 20 respectively. Door 10 may be tapered or otherwise configured adjacent its upper or outer end 28, see FIGURE 1, to provide easy access for loading means, e.g., fork trucks, to load the cargo thereon preparatory to lifting it to the truck floor level.

When it is open, door 10 is maintained in a horizontal position by means of flexible tension means 27, 29 which may be chains, belts or wires, chain belts being shown in the drawings. Each chain 27, 29 may be either permanently or removably secured at its outer end 30, near the respective upper corners of door 10. In the embodiment shown in FIGURE 1 the chains 27, 29 are preferably permanently secured at their outer ends 30, 30.

Each mast 19, 20 is provided with a freely rotating bearing wheel, sprocket, or sheave 31. The chains 27, 29 lead from their fixed ends 30 over the respective bearing sprockets 31. The other, or the movable or free end 33 of each chain 27, 29 is removably and selectively attached to an elevator anchor 34 by a clevis pin 35 (see FIG. 6). The anchors 34 are provided on masts 19, 20 preferably a short distance below the bearing sprockets 31. The length of the tension members 27, 29 is such that when so connected the platform 10 is held in a horizontal position as shown in FIGURE 1.

Thus, it will be seen that when the lift means 21 are actuated by control 22, the masts are shifted relative to bed 16, causing the platform to translate or move vertically while remaining in the horizontal plane. So operated, the door 10 acts as an elevator platform for loading or unloading.

For opening and closing the door 10 there is provided compounding or closure means including a second or compounding anchor 40 on an anchor arm 36 which is mounted to the mast, and a compounding or doubling sprocket or wheel 38 which is mounted to the guide or to the fixed support structure (see FIG. 6). The compounding sprockets 38 are mounted ahead of sprockets 31, with sufficient clearance that the mast sprockets 31 may pass the compounding sprockets as the masts are raised. Each arm 36 has an offset to provide clearance for the compounding sprocket 38 as the mast is moved, and carries the compounding chain anchor point 40 forward of the compounding sprockets 38 to permit the latter to move between the first sprocket 31 and the anchor 40. One or more spring loaded plungers 44 are preferably mounted to the truck body to provide an initial impetus to push the rear door 10 out of dead vertical position when it is being opened.

The operation of the platform 10 is illustrated in sequence by FIGURES 2 through 5. When it is desired to operate the platform 10 in horizontal or elevator fashion, the movable ends 33 of the chains 27, 29 are secured to their respective elevator anchors 34 on each inner mast 19, 20 below the sprockets 31, so that when the motors 21 are operated the masts will slide raising or lowering the door horizontally as an elevator. It will be appreciated that if desired the chains can be connected directly to anchors 35, without passing over the sprockets 31, and that other anchor points can be provided to hold the platform in a desired angulation.

To close door 10, the movable ends 33 of chains 27, 29 are transferred from the elevator anchors 34 to the compounding anchors 40 provided on arms 36 as shown in FIGURES 3 and 6. This is conveniently done while the door is supported on the ground. To facilitate this, the anchors 34 and 40 are preferably spaced equidistantly from sprocket 31, so that chains 27, 29 need not be drawn in to make the connection. When the motors 21 are actuated, door 10 initially remains horizontal as it moves upwardly, the chains extending straight between the respective sprockets 31 and anchors 40. As the masts continue to be moved upwardly, compounding sprockets 38 in effect move downward between sprockets 31 and anchors 40, and in so doing engage chains 27, 29. As the compounding sprockets 38 engage the chains, the chains are compounded or doubled, see FIGURES 4 and 5, effectively increasing the chain length between compounded sprockets 31 and anchors 40, drawing the door to vertical position. Hence, the distance between the bearing sprockets 31 and the fixed chain ends 30 is shortened as the door 10 moves upwardly and closes. When the inner masts 19, 20 have been moved upwardly to a position at which the bottom of the rear door 10 is approximately at the bed 16 of the truck, the top 28 of the door is completely closed with respect to the rear cargo space opening, see FIGURE 5. Thus, the door 10 is closed by a compounding of the roller chains 27, 29 which have provided the supporting means for holding the rear door in a horizontal position during its use as an elevator.

To open the door 10, the motors 21 are actuated to move masts 19, 20 downwardly, thereby permitting the opening movement of the door in a manner opposite to that of its closing. The initial opening impetus to the door 10 is provided by the spring loaded plungers 44 bearing on the closed door.

The alternative embodiment of the invention is best illustrated in FIGURE 7. In the alternative embodiment there is an elevator floor 51 rigidly disposed between the masts 19, 20. The masts 19, 20 also carry cross braces 20a for engagement by the linear fluid motors 21 to selectively raise and lower the masts, as was before described with respect to the preferred embodiment. Because of the large width of the masts 19, 20, two U-shaped mast guides 52, 53 are provided for each mast to ensure that the masts reciprocate up and down relative to the bed 16 of the vehicle in the required fashion without binding or sticking. Each pair of mast guides are disposed so that they face one another.

The door or ramp 10 is pivoted near its lower edge adjacent the bottom ends 24, 25 of the masts 19, 20, respectively, so that when the door is horizontally disposed it will lie in the same plane as the elevator floor 51. The door 10 need only be tall enough, when in a vertical position, to close approximately one-half of the cargo space opening, however, any height door 10 may effectively be used. A pair of outer doors 54, each pivoted about a vertical axis at each said of the cargo opening, are provided to effect closure of the opening. The door or ramp 10 may be tapered at its outer end 28 to provide easy access for loading means, e.g., fork trucks, to load the cargo onto the elevator platform 51 preparatory to lifting it to truck bed level. In addition, the ends 30 of the chains 27, 29 are preferably removably mounted, in this alternative embodiment, to the door 10 so that the chain ends 30 may be disengaged from the door, thereby permitting the door to hang vertically when in the open position so that the truck body 13, and bed 16, may be backed up adjacent an elevated loading dock.

Each of the masts 19, 20 and the inner mast guides 53, i.e., each mast assembly, has a bearing sprocket 31, an elevator anchor 34 and clevis pin 35, a compounding anchor 40 and a doubling sprocket 38 associated with it in a manner identical to that described before with relation to the preferred embodiment. Also, these elements cooperate together in the same manner as has been described to permit either the elevator platform 51 and door 10 to operate in elevator-like fashion, or the door 10 to be automatically closed as the elevator platform 51 is raised from the ground level to a position where it is in the same plane as the truck bed 16, see FIGURES 8–10.

Because of the extra chain length needed to compensate for the width of the platform 51, a pair of freely rotating, intermediate sprockets 55, 56 have been provided on the masts 19, 20 toward the side where mast guides 52 are positioned. Each of the chains 27, 29 is threaded over a sprocket 55 and under a sprocket 56 before reaching a bearing sprocket 31. As can be seen from FIGURES 8–10, the intermediate sprockets 55, 56 maintain a constant feed angle for the chains 27, 29 to the bearing sprockets 31, thereby ensuring efficient contact of the chains with the bearing sprocket 31 and compounding sprocket 38, no matter where the elevator floor 51 is positioned throughout its vertical reciprocatory movement.

FIGURES 1 through 10 illustrate two embodiments of the invention wherein the end 33 of the flexible tension members or chains 27, 29 associated with the mast and mast guide structure is selectively connectable to either an elevating anchor 34 or a compounding anchor 40. When it is desired that the cargo platform 10 be utilized in elevator fashion, the chain end 33 is connected to the elevator anchor 34, see FIGURE 2. On the other hand, when it is desired that the cargo platform 10 be used as a closure element, that is, raised from an open or horizontal position to a vertical or closed position, the free chain end 33 is secured to the compounding anchor 40, see FIGURE 4. Thus, in the two embodiments described above, the free end 33 of the chains 27, 29 is selectively connectable to different anchors 34, 40 for permitting elevator-like operation or opening-closing operation of the cargo platform as desired.

A second alternative embodiment to the invention is illustrated in FIGURES 11 through 15. In this embodiment the end of each flexible tension member or chains 27, 29 is permanently secured, as at 59, to the extension arm 36 mounted to the inner mast 19 through sprocket housing 61, see FIGURE 11. The inner mast 19 carries the rotatable bearing sprocket 31 within the housing 61. The flexible chain 27 passes over the sprocket 31 and is securely attached, as at 59, to the extension arm 36.

The extension arm 36 extends forward of the mast guide 53 so as to present the chain for engagement with the compounding sprocket 38, see FIGURES 14 and 15. The compounding sprocket 38 is rotatably mounted on a base plate 62 that is adapted for sliding engagement with a pair of rail guides 63. The base plate 62 preferably carries, at right angles thereto, a storage plate 64 mounted to one of its side edges.

When the cargo platform is adapted to be operated in elevator-like fashion, see FIGURES 11 and 13, the storage plate 64 is slipped into engagement with the rail guides 63, thereby removing the compounding sprocket 38 from compounding position. As the inner mast 19 is moved upwardly or downwardly relative to the mast guide 53, the compounding sprocket 38 is out of position and does not engage the chain 27 and, thus, the cargo platform 10 operates in elevator fashion. On the other hand, when it is desired to provide the cargo platform 10 in a closed attitude from a horizontal or open attitude, the base plate 62 carrying the compounding sprocket 38 is inserted between the rail guides 63, see FIGURES 14 and 15. The compounding sprocket 38 is thereby presented in the vertical path of the chain 27 so that the chain can be compounded, or doubled, as the mast 19 moves upwardly within the mast guide 53 to close the cargo platform.

Thus in the second alternative embodiment, as described immediately above, there has been provided apparatus to perform the functions of the structure of this invention wherein a compounding wheel 38 is selectively moved into and out of engagement with a fixed flexible tension member 27, as opposed to the first two embodiments described wherein a selectively connectable end 33 of tension member 27 is moved into and out of compounding relationship with a fixed compounding wheel 38. The apparatus of the second alternative embodiment has the advantage of ease of operation in that the outer end 28 of the platform 10 need not be supported to provide slack in the chain 27 when it is desired to convert the platform from elevator-like operation to open-close operation. Such support may be required with the selectively connectable chain end embodiments to ensure that sufficient slack be provided in the chains 27 to make the change from elevating anchor 34 to compounding anchor 40.

While there has been described what is at present considered to be the preferred embodiment of this invention, it will be apparent to those skilled in the art that various changes and modifications may be made therein without departing from the concept of this invention, and it is, therefore, intended to include all such changes and modifications as fall within the scope of the following claims.

What I desire to claim and protect by Letters Patent is:

1. A cargo door assembly comprising
   a first and a second mast assembly, each of said assemblies having a mast guide and a mast movably supported by said guide,
   lift means for moving said masts relative to said mast guides,
   a platform pivotally secured adjacent the lower ends of said masts to permit swinging movement of said platform between an open and a closed position,
   a flexible tension member having two ends, one of said ends being connected to said platform,
   a compounding wheel rotatably mounted to support means fixed relative to said first mast guide, and
   a first anchor mounted to support means fixed relative to said first mast, the other end of said tension member being connected to said first anchor,
   one of said flexible member's other end and said compounding wheel being selectively positionable between a first operating position whereat said tension member can be engaged by said compounding wheel between said tension member ends when said masts are moved relative to said mast guides for swinging said platform between an open and a closed position as a door, and a second operating position whereat said tension member cannot be engaged by said compounding wheel when said masts are moved relative to said mast guides for raising and lowering the platform as an elevator.

2. Apparatus as set forth in claim 1 wherein one of said flexible member's other end and said compounding wheel is selectively positionable between a first operating position whereat said tension member can be engaged by said compounding wheel between said tension member ends to decrease the straight line distance between said tension member ends when said masts are raised and to increase the straight line distance between said tension member ends when said masts are lowered, and a second operating position whereat said tension member cannot be engaged by said compounding wheel when said masts are moved relative to said mast guides.

3. Apparatus as set forth in claim 2 including a second anchor mounted to support means fixed relative to said first mast, said flexible member's other end being selectively conectable between said first anchor and said second anchor for selectively positioning said tension member in said first and second operating positions with said compounding wheel.

4. Apparatus as set forth in claim 3 wherein said compounding wheel is permanently mounted to said compounding wheel support means.

5. Apparatus as set forth in claim 4 wherein said support means comprises said first mast guide.

6. Apparatus as set forth in claim 3 including a bearing wheel rotatably mounted to support means fixed relative to said first mast, said tension member's other end being connected over said bearing wheel to said first anchor in said first operating position so that said compounding wheel can pass between said bearing wheel and said first anchor as said masts are raised and lowered thereby engaging said tension member and pivoting said platform.

7. Apparatus as set forth in claim 6 wherein said bearing wheel is permanently mounted to said bearing wheel support means.

8. Apparatus as set forth in claim 7 wherein said support means comprises said first mast.

9. Apparatus as set forth in claim 6 wherein said compounding wheel resides in a vertical plane between the vertical planes in which said bearing wheel and said first anchor are located.

10. Apparatus as set forth in claim 6 wherein said first anchor is spaced substantially horizontally from said bearing wheel.

11. Apparatus as set forth in claim 1 including means urging said platform outwardly from said mast assemblies when said platform is in said closed position.

12. Apparatus as set forth in claim 2 wherein said compounding wheel is removably mounted to said support means fixed relative to said mast guide so that said compounding wheel can be selectively positioned in said first and second operating positions with said flexible tension member.

13. Apparatus as set forth in claim 12 wherein said tension member's other end is permanently mounted to said first anchor.

14. Apparatus as set forth in claim 12 wherein said compounding wheel support means comprises said first mast guide.

15. Apparatus as set forth in claim 14 wherein said support means for said compounding wheel includes
   a base plate mounting said compounding wheel, and
   rail guides associated with said first mast guide for receiving said base plate so that said compounding wheel can be selectively positioned in said first operating position.

16. Apparatus as set forth in claim 15 including
   a storage plate integral with said base plate, said storage plate being receivable by said rail guides so that said compounding wheel can be selectively positioned in said second operating position.

17. Apparatus as set forth in claim 12 including
   a bearing wheel rotatably mounted to support means fixed relative to said first mast, said tension member's other end being connected over said bearing wheel to said first anchor in said first operating position so that said compounding wheel can pass between said bearing wheel and said first anchor as said masts are raised and lowered thereby engaging said tension member and pivoting said platform.

18. Apparatus as set forth in claim 17 wherein said bearing wheel is permanently mounted to said bearing wheel support means.

19. Apparatus as set forth in claim 17 wherein said bearing wheel support means comprises said first mast.

20. Apparatus as set forth in claim 17 wherein said compounding wheel resides in a vertical plane between the vertical planes in which said bearing wheel and said first anchor are located.

21. Apparatus as set forth in claim 17 wherein said first anchor is spaced substantially horizontally from said bearing wheel.

References Cited

UNITED STATES PATENTS

| | | |
|---|---|---|
| 2,236,317 | 3/1941 | Howland. |
| 3,024,926 | 3/1962 | Nolden. |
| 3,104,910 | 9/1963 | Kappen. |

ROBERT G. SHERIDAN, *Primary Examiner.*